US010380906B2

(12) United States Patent
Newport et al.

(10) Patent No.: US 10,380,906 B2
(45) Date of Patent: Aug. 13, 2019

(54) OBJECT ROTATING APPARATUS AND METHODS OF USING

(71) Applicants: Jonathan Newport, Washington, DC (US); Arthur Shapiro, Rockville, MD (US)

(72) Inventors: Jonathan Newport, Washington, DC (US); Arthur Shapiro, Rockville, MD (US)

(73) Assignee: AMERICAN UNIVERSITY, Washington, DC (US)

( * ) Notice: Subject to any disclaimer, the term of this patent is extended or adjusted under 35 U.S.C. 154(b) by 551 days.

(21) Appl. No.: 15/154,061

(22) Filed: May 13, 2016

(65) Prior Publication Data

US 2016/0335912 A1 Nov. 17, 2016

Related U.S. Application Data

(60) Provisional application No. 62/162,130, filed on May 15, 2015.

(51) Int. Cl.
*A63F 9/24* (2006.01)
*G09B 5/06* (2006.01)
(52) U.S. Cl.
CPC ..................................... *G09B 5/06* (2013.01)
(58) Field of Classification Search
CPC .............................. G07F 17/3213; G09B 5/06
See application file for complete search history.

(56) References Cited

U.S. PATENT DOCUMENTS

| | | | | | |
|---|---|---|---|---|---|
| 3,054,217 | A | * | 9/1962 | D Amato | A63F 7/382 446/236 |
| 4,300,081 | A | * | 11/1981 | Van Landingham | H02P 7/2913 318/599 |
| 5,261,851 | A | * | 11/1993 | Siebert, Jr. | A63H 1/00 446/236 |
| 6,471,606 | B1 | * | 10/2002 | Simpson | A63B 69/0002 446/23 |
| 7,559,840 | B1 | * | 7/2009 | D'Avanzo | G07F 17/3211 273/138.1 |
| 2002/0198068 | A1 | * | 12/2002 | Jordan | A63B 69/0002 473/418 |
| 2004/0009807 | A1 | * | 1/2004 | Miller | G07F 17/32 463/20 |
| 2004/0214630 | A1 | * | 10/2004 | Mayeroff | G07F 17/3211 463/20 |
| 2012/0004054 | A1 | * | 1/2012 | McKendrick | A63B 69/0075 473/418 |
| 2012/0244962 | A1 | * | 9/2012 | Muscarello | A63B 37/00 473/451 |
| 2014/0228157 | A1 | * | 8/2014 | Johnston | A63B 69/0002 473/451 |

* cited by examiner

*Primary Examiner* — Steve Rowland
(74) *Attorney, Agent, or Firm* — Thompson Hine L.L.P.

(57) ABSTRACT

The present application relates to an apparatus for controllably rotating an object, such as a baseball or any sporting ball, and methods of using the apparatus for measurement of visual acuity and/or training. Specifically, in certain embodiments, an object is rotated at a selected revolutions per minute (RPM) and a subject's exposure to the rotating object is controlled by illumination and/or controlled exposure, and assessing a subject's ability to recognize the direction of rotation.

8 Claims, 1 Drawing Sheet

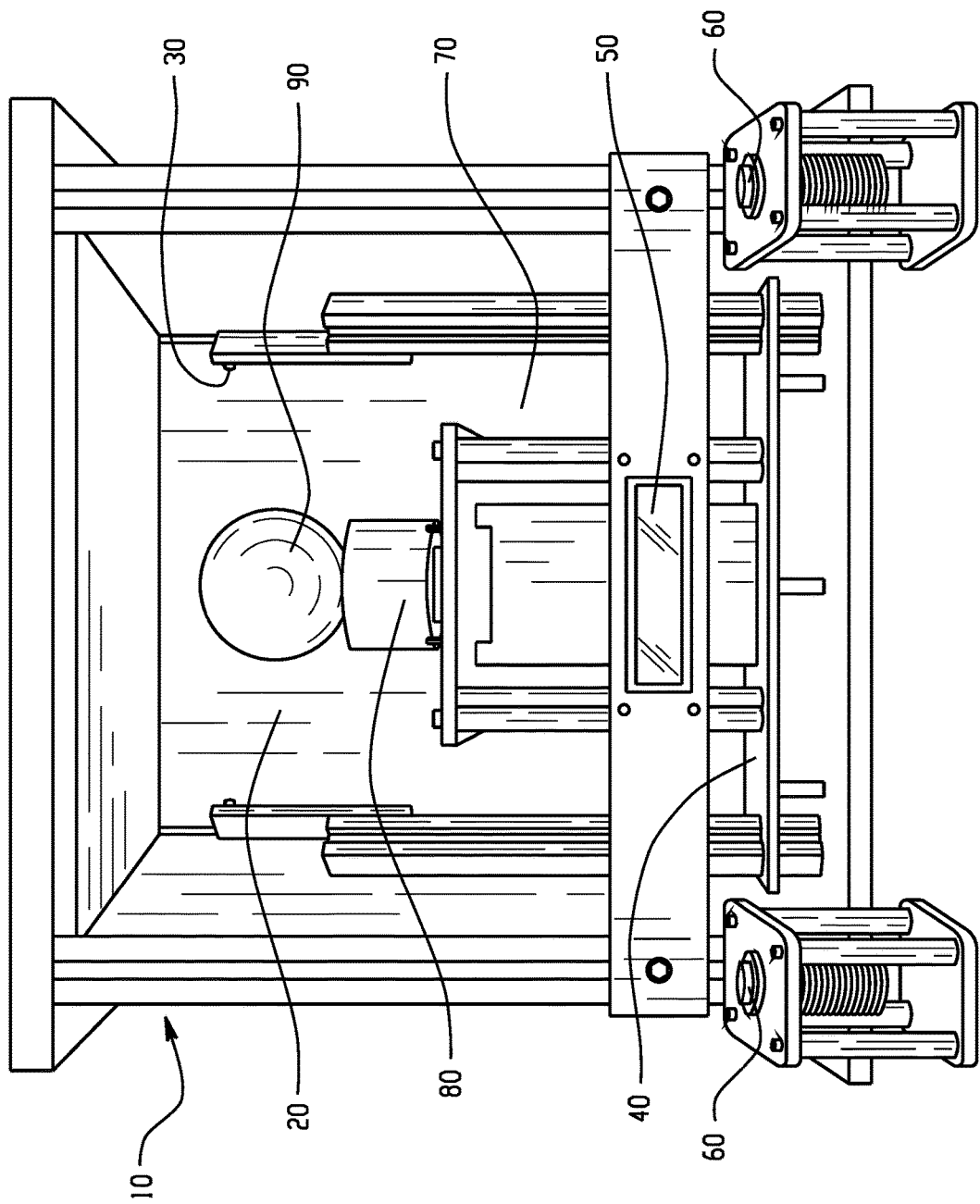

OBJECT ROTATING APPARATUS AND METHODS OF USING

This application claims priority to U.S. Provisional Patent Application Ser. No. 62/162,130 filed May 15, 2015, which is expressly incorporated by reference herein in its entirety.

TECHNICAL FIELD

The present application relates to an apparatus for controllably rotating an object, such as a baseball or any sporting ball, and methods of using the apparatus for measurement of visual acuity and/or training. Specifically, in certain embodiments, an object is rotated at a selected revolutions per minute (RPM) and a subject's exposure to the rotating object is controlled by illumination and/or controlled exposure, and assessing a subject's ability to recognize the direction of rotation.

BACKGROUND

In many sports which involve the use of a ball, it is often important to not only be able to recognize the direction the ball is rotating, but to recognize this difference quickly. For example, in baseball, one important difference between a fastball, a curveball, a slider, and a screwball is the direction in which the ball spins. Other important factors are the speed of the pitch and rate of spin. Generally speaking, a ball thrown with a spin will curve in the same direction that the front of the ball (home plate side, when pitched) turns. If the ball is spinning from top to bottom (topspin), it will tend to nosedive into the dirt. If it's spinning from left to right, the pitch will break toward third base. The faster the rate of spin, the more the ball's path curves.

In the game of baseball, the pitcher throws a 2.9-inch-diameter ball in the direction of home plate, which is 60.5 feet away from the center of the pitcher's mound; the opponent (referred to as the batter) stands near home plate and attempts to hit the ball with a sturdy wooden bat. The pitcher makes the batter's task difficult by throwing the ball at different velocities and with different spins. One well-known type of pitch, the curveball, travels at about 75 mph with a 1500 rpm spin. The curveball is a physically measurable phenomenon: the imbalance of forces created by the ball's spin causes the ball to deviate from a straight line and to follow a smooth parabolic path. Since you only have about 0.4 seconds from when the ball leaves the pitchers hand to when it hits the catcher's mitt, it is critical to quickly recognize the rotation of the ball.

Typical major league fastballs travel at 90 mph, with a 1200 rpm backspin. Fastballs descend on their way from the pitcher's mound to home plate, but batters often report the perception that fastballs rise. There are two different types of fastballs, a two-seam and a four-seam. The two-seam fastball spins so that the two seams cross the batter's field of view on each rotation of the ball, and the four-seam fastball spins so that the four seams cross the batter's field of view on each rotation).

Similarly in soccer, for example, a goalie will need to quickly recognize the rotation of the ball in order to better position himself to block the ball from entering the goal.

Thus, there is a need for an apparatus which can replicate the spin of an object, such as a ball, under various conditions, and methods of using the apparatus to evaluate a subjects ability to detect the rotation of the object, as well as methods for training subjects to more quickly detect an object's rotation.

BRIEF DESCRIPTION OF THE DRAWINGS

FIG. 1 shows the described apparatus according to one embodiment.

DETAILED DESCRIPTION

The following detailed description will illustrate the general principles of the invention.

The disclosed apparatus and methods involve subjecting an object, such as a ball, to various rotations in a controlled and modifiable environment, and a subjects ability to recognize the rotation.

In one aspect, and referring to FIG. 1, the described apparatus comprises a rotary motion assembly comprising an object 90 attached to a shaft 80, the shaft rotatably coupled to a rotary motion actuator such that rotations of the rotary motion actuator rotate the object, and an exposure control assembly. In one embodiment, the object may be mounted on a shaft which is operably linked with a rotary motion actuator, such as a variable speed electric motor. In one embodiment, the shaft and the attached object are vertically aligned such that the object can be rotated either to the "left" based on the movement of the front of the object from right to left, where the front of the object is the portion observable by a subject, or to the "right" based in the movement of the front of the object from left to right. In alternate embodiments, the axis of rotation of the object need not be vertical but can be angled from the vertical at a degree of greater than 0 to about 90°, either to the left or the right. In addition, the point of attachment between the rotating shaft and the object can be varied. For example, a baseball can be mounted such that the rotation resembles a "two seam" rotation, a "four seam" rotation, or any other point of attachment. The speed of rotation can be controlled as well as the direction of rotation, by a controller. In one embodiment, the speed of rotation is controlled by a controller, such as a computer. The rotational speed may be fixed at a desired speed or may be changed as a function of time. For example, the ball may be rotated at speed X for a period of time A and then rotated at speed Y for a period of time B. Any combination of speeds and/or times may be used. In one embodiment, the ball is a baseball and is rotated from greater than 0 RPM to about 3000 RPM. In one embodiment, the apparatus also includes an information display 50.

As described herein, controlling viewability of the rotating object comprises an exposure control assembly which controllably illuminates the object such that it is viewable during illumination, and/or controlling the ability to see the object, such as through the use of a filter or shutter 70 disposed between the rotating object and the subject, which controls when and for how long the rotating object is viewable by the subject. In various embodiments, the exposure control assembly is controlled by a controller. In some embodiments, the illumination source may be ambient light.

In some aspects, the apparatus comprises a rotary motion assembly comprising an object 90 attached to a shaft 80, the shaft 80 rotatably coupled to a rotary motion actuator such that rotations of the rotary actuator rotate the object, an illumination source 30 that illuminates the object, an exposure control assembly, and a controller, such that the controller controls at least the rotary motion actuator and the exposure control assembly. In additional embodiments, the controller also controls the illumination source 30.

In a further aspect, the rotary motion assembly is disposed in a chamber 10. In one embodiment, the chamber comprises a top, a bottom, two side panels and a back side panel, while leaving the front, which faces the subject, open. In a further embodiment, the front is also covered with a translucent panel such as glass. In these embodiments, exposure of the rotating object to the subject is controlled by controlling illumination of the object. In an alternate embodiment, front panel of the chamber is an exposure control assembly, such as a filter or a shutter 70.

In one embodiment, the motor, which is operably linked to the shaft, is disposed underneath the bottom panel or is also disposed within the chamber 10. In various embodiments, the chamber also comprises a foreground illumination source, such as a lamp or LED. The foreground illumination source primarily illuminates the front of the ball, facing the subject. The foreground illumination source is also operably linked to the controller such that the interior of the chamber and the ball can be illuminated for a desired period of time. Further, the intensity of the illumination can be controlled. In yet a further embodiment, the chamber may also comprise a background illumination source 20, where the background illumination source can either illuminate the background behind the ball, or create patterns or images behind the ball and against the back side panel. In one embodiment, the back side panel 20 comprises a computer monitor which is able to project any desired pattern or images. In another embodiment, one or both of the side panels are background illuminated and may comprise a computer monitor. In some embodiments where multiple side and back panels are illuminated, the illumination and/or intensity on each panel may be the same or different. In one embodiment, the side panels are perpendicular to the back panel. In another embodiment, the side panels are not perpendicular to the back panel, but are at an angle of greater than 90°.

In one aspect, a method for assessing a subjects ability to recognize the rotation of the object using the described apparatus is provided. In various embodiments, the subject is oriented to be facing the front side of the apparatus. The subject then observes the apparatus, and specifically, the object inside and indicates whether the object appears to be rotating to the left or the right. In various embodiments, the object is illuminated using foreground illumination for a period of time and a desired intensity level, during which the subject determines the direction of rotation. In one embodiment, the object is illuminated using foreground illumination for a period from about 100 ms to about 2000 ms. In various embodiments, as described above, background illumination may also be employed and varied during the assessment process. The distance between the subject and the apparatus can be varied. In some embodiments, the subject's ability to view the rotating object is controlled by the exposure control assembly. In some embodiments, the subject's ability to view the rotating object is controlled by both the illumination source(s) and the exposure control assembly.

Also, the relationship between the apparatus and the subject can be varied, such that the subject may be positioned directly in front of the apparatus or at a position which is not directly in front of the apparatus. In one embodiment, the subject views the rotating ball with the fovea, or a "head on" view, while in other embodiments, the subject views the rotating ball with peripheral vision.

In one aspect, a method for training a subject to more quickly recognize the rotation of a ball using the described apparatus is also provided. In general, the method of training the subject comprises the method for assessing the subject, but with repetitions of the assessing method. For example, initially, the subject will be required to determine spin direction using a slower rotation and/or a longer and/or brighter illumination period. In subsequent training, the rotation speed is increased and/or the illumination time is decreased and/or the illumination intensity is decreased. In various embodiments, as described above, background illumination may also be employed and varied during the training process.

In various embodiments of the described methods, the subject may indicate the direction of rotation by a response indicator 60. In various embodiments, the response indicator 60 includes buttons, switches, capacitive touch sensors or verbal indications picked up by a microphone. In one embodiment, the subject responds by selecting or pressing the appropriate button on a hand held response indicator 60. The response indicator 60, such as the hand held response indicator, can also be coupled to a computer to record and track the subjects responses. In one embodiment, the computer is also the apparatus controller such that the apparatus parameters are also recorded with the subject's responses. Further, the computer can calculate and plot the subject's response in relation to any or all of the apparatus parameters described above.

The embodiments of this invention described above are exemplary of numerous embodiments that may be made within the scope of the appended claims.

What is claimed is:

1. A method for assessing a subject's ability to recognize a rotational direction of a ball, the method comprising
positioning the subject in relation to an apparatus, the apparatus comprising
a rotary motion assembly comprising an object attached to a shaft, the shaft rotatably coupled to a rotary motion actuator such that rotations of the rotary motion actuator rotate the object, and
an exposure control assembly,
initiating a selectively programmed set of conditions via a controller to cause the object to spin at a desired rotation speed and to be foreground illuminated for a specified period of time and/or intensity,
recording the subject's ability to recognize the direction of rotation of the ball, and
providing feedback to the subject as to whether his/her response is correct or incorrect.

2. The method of claim 1, further comprising background illumination for a specified period of time, a specified pattern, and/or a specified intensity.

3. The method of claim 1 wherein recording the subject's response comprises selecting a rotation direction using a hand held response indicator which is operably linked to a computer.

4. The method of claim 1 where the method is presented multiple times and the conditions adjusted in accordance with the subjects response so as to assess the threshold of correct perception for variables selected from rotation speed, duration of presentation, viewing distance, different size and style of objects, illumination, and/or contrast of object with background.

5. A method for training a subject to recognize the rotational direction of a ball, the method comprising the method of claim 1, wherein the method is repeated under varying conditions, and recording and tracking the subject's ability to recognize the direction of rotation of the ball.

6. The method of claim 5 where the subject's performance is measured over repeated sessions in order to assess whether the subject's ability improves over time.

7. The method of claim 1 wherein the exposure control assembly is a filter, wherein the filter is an optical modulator.

8. The method of claim 7 wherein the optical modulator is an electro-optic modulator.

* * * * *